United States Patent
Wang et al.

(10) Patent No.: US 12,022,946 B2
(45) Date of Patent: Jul. 2, 2024

(54) FOOT ADJUSTING SYSTEM AND REFRIGERATOR HAVING SAME

(71) Applicants: QINGDAO HAIER REFRIGERATOR CO., LTD., Shandong (CN); HAIER SMART HOME CO., LTD., Shandong (CN)

(72) Inventors: Changzhi Wang, Shandong (CN); Bin Fei, Shandong (CN); Enpin Xia, Shandong (CN); Xiaobing Zhu, Shandong (CN); Kang Li, Shandong (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 0 days.

(21) Appl. No.: 18/012,003

(22) PCT Filed: May 8, 2021

(86) PCT No.: PCT/CN2021/092303
§ 371 (c)(1),
(2) Date: Dec. 21, 2022

(87) PCT Pub. No.: WO2021/227972
PCT Pub. Date: Nov. 18, 2021

(65) Prior Publication Data
US 2023/0263304 A1    Aug. 24, 2023

(30) Foreign Application Priority Data
Jun. 30, 2020  (CN) .......................... 202010614722.1

(51) Int. Cl.
A47B 91/00 (2006.01)
A47B 91/02 (2006.01)
F25D 23/10 (2006.01)

(52) U.S. Cl.
CPC .......... *A47B 91/002* (2013.01); *A47B 91/024* (2013.01); *F25D 23/10* (2013.01); *F25D 2323/0011* (2013.01); *F25D 2400/38* (2013.01)

(58) Field of Classification Search
CPC ......... F25D 2323/00; F25D 2323/0011; F25D 2400/38; F25D 23/00; F25D 23/10;
(Continued)

(56) References Cited

U.S. PATENT DOCUMENTS

| | | | | |
|---|---|---|---|---|
| 4,789,121 A * | 12/1988 | Gidseg | ..................... | F16M 7/00 248/188.4 |
| 4,918,783 A * | 4/1990 | Chu | ........................ | B60B 33/04 280/43.17 |
| 4,955,569 A * | 9/1990 | Hottmann | ................ | F16M 7/00 248/188.4 |

(Continued)

FOREIGN PATENT DOCUMENTS

| | | |
|---|---|---|
| CN | 2333979 Y | 8/1999 |
| CN | 201346192 Y * | 11/2009 |

(Continued)

OTHER PUBLICATIONS

Translation CN106568288A, 2 pages (Year: 2017).*
(Continued)

*Primary Examiner* — Andrew Roersma
(74) *Attorney, Agent, or Firm* — Locke Lord LLP; Tim Tingkang Xia, Esq.

(57) ABSTRACT

Provided are a foot adjusting system and a refrigerator having same, the foot adjusting system including: a driving rotating wheel, a part of which forms a driving rotating shaft; a drive belt, sleeved on an outer periphery of the driving rotating shaft; and a foot, provided with a screw rod
(Continued)

and a driven rotary disc, the screw rod being rotatably screwed into a threaded hole at a bottom of an apparatus where the foot adjusting system is installed, an outer periphery of the driven rotary disc being sleeved with the drive belt to be in a transmission connection with the driving rotating shaft, and the driven rotary disc being fixedly connected to the screw rod or integrated with the screw rod to form a one-piece part so as to drive the screw rod to rotate. The leveling difficulty and the installation difficulty of the apparatus can be reduced.

10 Claims, 9 Drawing Sheets

(58) Field of Classification Search
CPC ..... A47B 91/002; A47B 91/02; A47B 91/024; A47B 91/026; D06F 39/125; A47L 15/4253; F16M 7/00
See application file for complete search history.

(56) References Cited

U.S. PATENT DOCUMENTS

| | | | | |
|---|---|---|---|---|
| 7,350,269 B2 * | 4/2008 | Dominic | ............. | B60B 33/0002 |
| | | | | 16/30 |
| 7,556,227 B2 * | 7/2009 | Thuelig | .................... | F16M 7/00 |
| | | | | 248/188.4 |
| 8,205,843 B2 * | 6/2012 | Phillips | ................ | A47B 91/002 |
| | | | | 248/188.8 |
| 2005/0247834 A1 | 11/2005 | Thuelig | | |
| 2020/0316991 A1 * | 10/2020 | Yeo | ..................... | B60B 33/0089 |
| 2023/0251016 A1 * | 8/2023 | Wang | ....................... | F25D 23/00 |
| | | | | 62/259.1 |
| 2023/0251017 A1 * | 8/2023 | Li | ............................. | F16G 1/28 |
| | | | | 62/259.1 |

FOREIGN PATENT DOCUMENTS

| | | | | | |
|---|---|---|---|---|---|
| CN | 101868165 | A | | 10/2010 | |
| CN | 204611230 | U | | 9/2015 | |
| CN | 106568288 | A | | 4/2017 | |
| CN | 106595167 | A | * | 4/2017 | |
| CN | 108930870 | A | | 12/2018 | |
| EP | 2468136 | A1 | * | 6/2012 | ........... A47B 91/024 |
| JP | H11169257 | A | | 6/1999 | |
| JP | 2001050641 | A | | 2/2001 | |
| JP | 2004059196 | A | | 2/2004 | |
| JP | 2007139256 | A | | 6/2007 | |
| KR | 19950026436 | A | * | 10/1995 | ............. A47B 91/16 |
| KR | 19980017937 | A | | 6/1998 | |
| KR | 200175068 | Y1 | * | 1/2000 | ............. A47B 91/02 |
| KR | 200395362 | Y1 | * | 9/2005 | .............. F16B 35/00 |
| KR | 1020120107601 | A | * | 10/2012 | ............. B60B 33/06 |
| WO | WO-2004107914 | A1 | * | 12/2004 | ........... A47B 91/028 |
| WO | WO-2010020633 | A1 | * | 2/2010 | ......... A47L 15/4253 |
| WO | WO-2011080230 | A1 | * | 7/2011 | ......... A47L 15/4253 |
| WO | 2016193369 | A1 | | 12/2016 | |
| WO | WO-2016193369 | A1 | * | 12/2016 | |
| WO | WO-2020126470 | A1 | * | 6/2020 | ......... A47L 15/4253 |

OTHER PUBLICATIONS

Chinese Intellectual Property Office (ISR/CN), "International Search Report for PCT/CN2021/092303", China, Jul. 15, 2021.
SIPO, "1st CN Office Action and Search Report for CN Application No. 202010614722.1", China.
EPO, "Supplementary European Search Report for EP Application No. 21804363.6", Hague, Germany, Sep. 15, 2023.
JPO, "Office Action for JP Application No. 2022-579678", Japan.

* cited by examiner

FOOT ADJUSTING SYSTEM AND REFRIGERATOR HAVING SAME

CROSS-REFERENCE TO RELATED PATENT APPLICATIONS

This application is a U.S. national stage application of PCT Patent Application No. PCT/CN2021/092303 filed on May 8, 2021, which claims priority to and the benefit of Chinese Application No. 202010614722.1 filed Jun. 30, 2020, which are incorporated herein in their entireties by reference.

FIELD OF THE INVENTION

The present invention relates to an apparatus installation technology, and in particular to a foot adjusting system and a refrigerator having same.

BACKGROUND OF THE INVENTION

A foot is used to be installed at a bottom of an apparatus to support the apparatus on the ground. Some of feet in the prior art can adjust the parallelism of bottoms of apparatuses when the apparatuses are in a stationary state. However, when the installation space of the apparatus is relatively small, the installation personnel cannot reach some parts of the apparatus, which will limit the installation personnel to adjust the apparatus at these parts, resulting in a great difficulty in a leveling process; and therefore, the whole installation process is great in operation difficulty and low in apparatus installation efficiency.

Therefore, how to provide a foot adjusting system to reduce the installation difficulty of the apparatus has become an urgent technical problem to be solved by those skilled in the art.

BRIEF DESCRIPTION OF THE INVENTION

An object of the present invention is to provide a foot adjusting system and a refrigerator having same that at least solve any aspect of the above technical problem.

A further object of the present invention is to provide a foot adjusting system to reduce the installation difficulty of an apparatus.

A still further object of the present invention is to increase the adjustment efficiency of the foot adjusting system.

Another further object of the present invention is to prolong the service life of the foot adjusting system.

Another still further object of the present invention is to simplify an installation structure of a refrigerator and thus reduce the manufacturing cost.

According to an aspect of the present invention, provided is a foot adjusting system, including: a driving rotating wheel, a part of which forms a driving rotating shaft; a drive belt, sleeved on an outer periphery of the driving rotating shaft; and a foot, provided with a screw rod and a driven rotary disc, the screw rod being rotatably screwed into a threaded hole at a bottom of an apparatus where the foot adjusting system is installed, an outer periphery of the driven rotary disc being sleeved with the drive belt so as to be in a transmission connection with the driving rotating shaft, and the driven rotary disc being fixedly connected to the screw rod or integrated with the screw rod to form a one-piece part so as to drive the screw rod to rotate.

Optionally, belt teeth are formed at an inner peripheral edge of the drive belt; the driving rotating shaft is a gear shaft, and first gear teeth meshed with the belt teeth are formed on an outer peripheral edge of the driving rotating shaft; and the driven rotary disc is disc-shaped, and second gear teeth meshed with the belt teeth are formed on an outer peripheral edge of the driven rotary disc.

Optionally, the rotation axes of the driven rotary disc and the screw rod are coaxial with the central axis of the driven rotary disc and the central axis of the screw; and the driven rotary disc extends radially outwards from a bottom section of the screw rod.

Optionally, the foot further includes: a support base, a part of which forms a support platform, and the driven rotary disc being disposed on the support platform; and a roller wheel, rollably disposed below the support platform.

Optionally, the support base is cylindrical, and the support platform is a horizontal top wall portion on the support base; the driven rotary disc is integrated with the support platform to form a one-piece part, and is formed by extending upward from the support platform; the support base further includes: a horizontal bottom wall portion, a part of which sinks inward to form a plurality of ball socket portions; and there are a plurality of roller wheels that are spherical, and each of the roller wheels is embedded in one of the ball socket portions.

Optionally, the roller wheel includes a wheel shaft extending in a horizontal direction, and a wheel body rotating around the wheel shaft; the support platform is a horizontal plate wall portion on the support base; the driven rotary disc is rotatably disposed at the support platform; and the support base further includes: a downturned shaft connecting portion, extending downward from the support platform and having a shaft hole for matching with the wheel shaft so as to enable the wheel shafts to be rotatably connected to the support base.

Optionally, the support platform is provided with an unthreaded hole running through a thickness direction of a main body plate surface of the support platform; the driven rotary disc is disposed above the unthreaded hole; and the foot further includes a connecting piece, one end of which is fixedly connected to the driven rotary disc or integrated with the driven rotary disc to form a one-piece part, and the other end of which passes through the unthreaded hole and is matched with a lower peripheral edge of the unthreaded hole to limit the freedom of the driven rotary disc to move in a straight line relative to the support platform in its rotation axis direction.

Optionally, the driving rotating wheel further includes a disc-shaped driving rotary disc, and at least one groove or protrusion is formed on an outer periphery of the driving rotary disc to match a wrench tool and/or another drive belt; the driving rotary disc is fixedly connected to the driving rotating shaft or integrated with the driving rotating shaft to form a one-piece part so as to drive the driving rotating shaft to rotate; the rotation axes of the driving rotary disc and the driving rotating shaft are coaxial with the central axis of the driving rotary disc and the central axis of the driving rotating shaft; and the driving rotary disc extends radially outwards from a bottom section of the driving rotating shaft.

Optionally, the screw rod and the driven rotary disc form an adjustment portion of the foot; there are two adjustment portions that are a first adjustment portion and a second adjustment portion, respectively; a plurality of second gear teeth are formed on an outer peripheral edge of the driven rotary disc of the first adjustment portion; a plurality of third gear teeth are formed on the outer peripheral edge of the driven rotary disc of the second adjustment portion; the second gear teeth are in transmission meshing with the drive belt, and the third gear teeth are in transmission meshing with the second gear teeth; and the disc parameter of the driven rotary disc of the first adjustment portion is greater than that of the driven rotary disc of the second adjustment portion, and screw direction of the screw rod of the first adjustment portion is opposite to that of the screw rod of the second adjustment portion.

According to another aspect of the present invention, also provided is a refrigerator, including: at least one foot adjusting system according to any one as described above, disposed at a bottom of the refrigerator, the bottom of the refrigerator being provided with a threaded hole, and the screw rod being in a screwed connection with the threaded hole.

According to the foot adjusting system and the refrigerator having same of the present invention, the foot adjusting system includes the driving rotating wheel, the drive belt, and the foot. A part of the driving rotating wheel forms the driving rotating shaft, and the drive belt is sleeved on the outer periphery of the driving rotating shaft. The foot is provided with the screw rod and the driven rotary disc, the screw rod is rotatably screwed into the threaded hole at the bottom of the apparatus, the driven rotary disc is in a transmission connection with the driving rotating shaft by means of the drive belt and is fixedly connected to the screw rod or integrated with the screw rod to form the one-piece part so as to drive the screw rod to rotate. By adopting the foot adjusting system of the present invention, the screw rod of the foot is indirectly driven to rotate by driving the driving rotating shaft to rotate, and the screw rod of the foot can be adjusted at multiple different positions, such that the leveling difficulty of the apparatus can be obviously reduced, and the installation difficulty thereof can further be reduced.

Further, according to the foot adjusting system and the refrigerator having same of the present invention, the foot is also provided with the support base and the roller wheel. The roller wheel is rotatably disposed below the support platform of the support base. In an installation process, the roller wheel is able to roll along a supporting surface on which the apparatus is located, and the screw rod can rotate relative to the threaded hole of the apparatus, so that the foot adjusting system of the present invention is both suitable for a leveling process of the apparatus and suitable for a moving process of the apparatus, and is also small in volume, simple and easy to adjust, large in adjustment range and low in manufacturing cost. By adopting the foot adjusting system of the present invention, the installation efficiency of the apparatus can be increased, and the labor cost is thus lowered.

Further, according to the foot adjusting system and the refrigerator having same of the present invention, since the driven rotary disc can rotate relative to the support platform, when the driven rotary disc is driven to drive the screw rod to rotate, the support platform can be stationary, and thus the roller wheel can be prevented from rotating accordingly during the rotation of an adjustment rotary disc, which not only makes the leveling process of the apparatus easy to operate, and saves time and effort, but also reduces or avoids the wear of the roller wheel and prolongs the service life of the foot adjusting system.

Even furthermore, according to the foot adjusting system and the refrigerator having same of the present invention, because the foot adjusting system of the refrigerator has both a leveling function and a moving function, it is possible to reduce or avoid the installation of other auxiliary structures on the bottom of the refrigerator, thereby simplifying an installation structure of the refrigerator and reducing the manufacturing cost.

The above and other objects, advantages and features of the present invention will be more apparent to those skilled in the art from the following detailed description of specific embodiments of the present invention in conjunction with the accompanying drawings.

BRIEF DESCRIPTION OF THE DRAWINGS

Hereinafter, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the figures.

DETAILED DESCRIPTION

Figure 1:
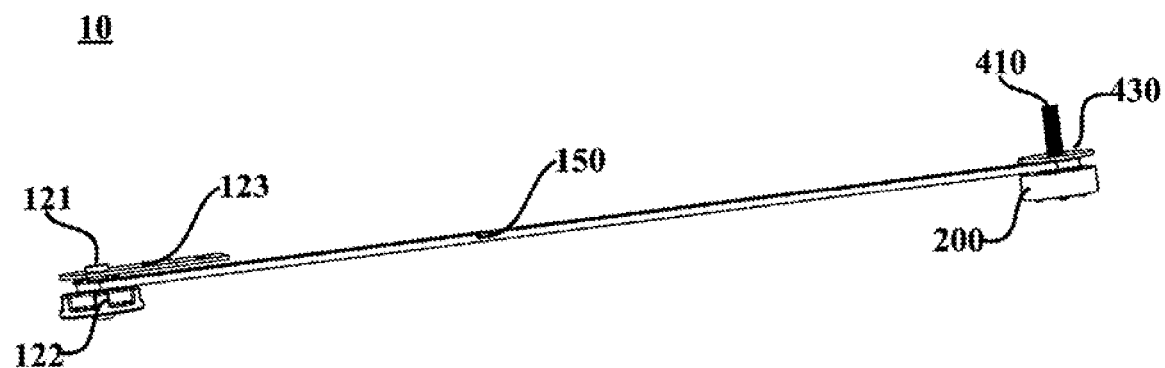
FIG. 1 is a schematic diagram of a foot adjusting system according to an embodiment of the present invention.

FIG. 1 is a schematic diagram of a foot adjusting system 10 according to an embodiment of the present invention. The foot adjusting system 10 of the embodiment is suitable for being installed on a bottom of an apparatus for installing the apparatus to a set position. The foot adjusting system 10 of the embodiment may be applied to various apparatuses, such as a refrigerator 70, an air conditioner, a washing machine, and other household appliances, and may also be applied to any other equipment, especially suitable for a built-in refrigerator 70.

The foot adjusting system 10 generally includes a driving rotating wheel 120, a drive belt 150, and a foot 110, and the drive belt 150 is sleeved on the driving rotating wheel 120 and the foot 110.

The drive belt 150 may be a synchronous belt or a synchronous chain, or any other type. In the embodiment, the drive belt 150 may be the synchronous belt. The embodiment only takes the case in which the drive belt 150 is the synchronous belt as an example. Those skilled in the art should be fully capable of expanding other types of drive belts 150 on the basis of understanding the embodiment, which will not be shown one by one herein.

Figure 2:
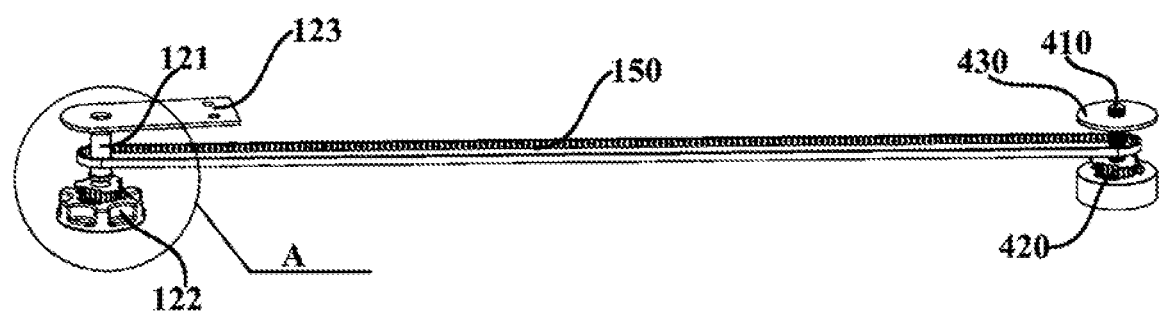
FIG. 2 is an exploded view of the foot adjusting system shown in FIG. 1.
Figure 3:
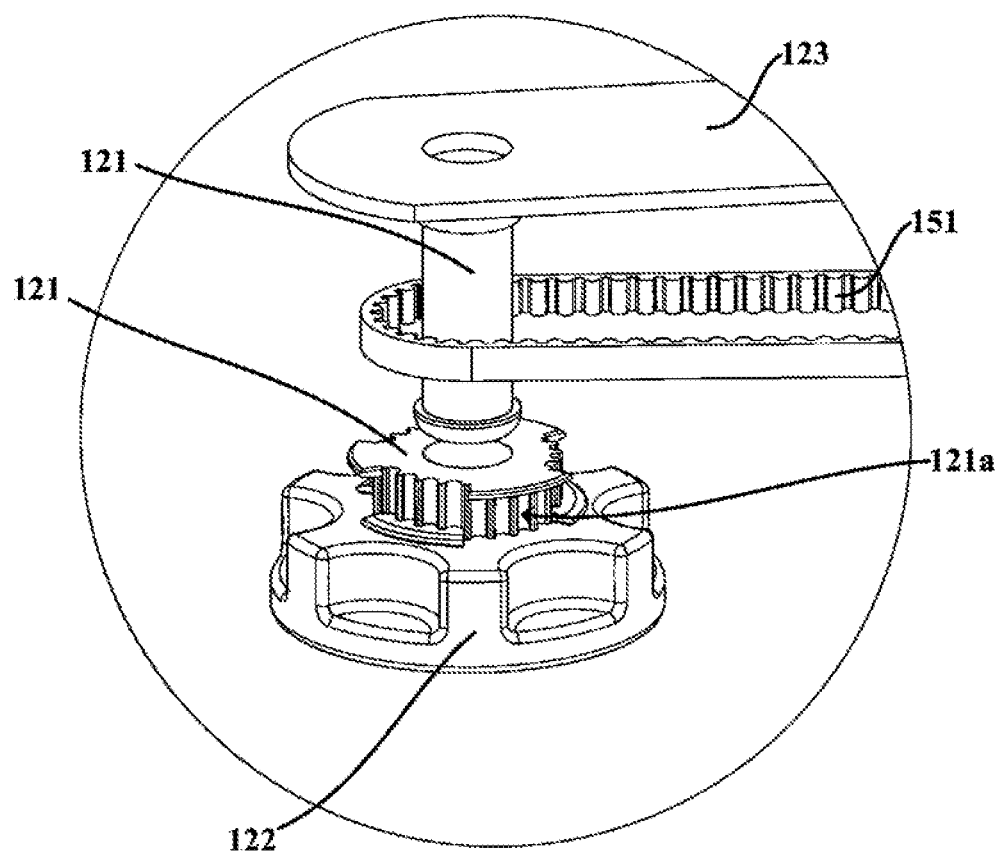
FIG. 3 is a partial enlarged view of A in FIG. 2.

FIG. 2 is an exploded view of the foot adjusting system 10 shown in FIG. 1, and FIG. 3 is a partial enlarged view of A in FIG. 2.

Belt teeth 151 are formed at an inner peripheral edge of the synchronous belt. The synchronous belt may be annular.

The synchronous belt is meshed with the driving rotating wheel 120 and the foot 110 through its inner peripheral edge. The belt teeth 151 can be evenly distributed in a spaced manner along the inner peripheral edge of the synchronous belt.

The driving rotating wheel 120 includes a driving rotating shaft 121 and a driving rotary disc 122, and may further include a supporting plate 123. A part of the driving rotating wheel 120 forms the driving rotating shaft 121. The drive belt 150 may be sleeved on an outer periphery of the driving rotating shaft 121. The driving rotating shaft 121 may be a gear shaft, and first gear teeth 121a meshed with the belt teeth 151 are formed on an outer peripheral edge of the driving rotating shaft. The driving rotary disc 122 is disc-shaped, and at least one groove or protrusion is formed on an outer periphery of the driving rotary disc 122 for matching with a wrench tool and/or another drive belt 150. In addition, the driving rotary disc 122 is fixedly connected to the driving rotating shaft 121 or integrated with the driving rotating shaft 121 to form a one-piece part so as to drive the driving rotating shaft 121 to rotate. That is, the driving rotary disc 122 can be rotated under the drive of the wrench tool and/or another drive belt 150, thereby driving the driving rotating shaft 121 to rotate.

In the embodiment, the rotation axes of the driving rotary disc 122 and the driving rotating shaft 121 are coaxial with the central axis of the driving rotary disc 122 and the central axis of the driving rotating shaft 121. Both the central axis of the driving rotary disc 122 and the central axis of the driving rotating shaft 121 may extend in a vertical direction.

The driving rotary disc 122 extends radially outwards from a bottom section of the driving rotating shaft 121. That is, the driving rotating shaft 121 may be substantially located above the driving rotary disc 122.

The driving rotary disc 122 is not only used to drive the driving rotating shaft 121 to rotate, but also forms a base of the driving rotating shaft 121 to support the driving rotating shaft 121. The diameter of the driving rotating shaft 121 may be smaller than the disc diameter of the driving rotary disc 122, wherein the disc diameter refers to the diameter of a circle where an outer peripheral edge of a disc is located, which can improve the structural stability of the driving rotating wheel 120. In the embodiment, the driving rotary disc 122 is used to be supported on a supporting surface (for example, the ground) where the apparatus is located.

The supporting plate 123 may be located at a top end of the driving rotating shaft 121, which can not only limit the synchronous belt on the driving rotating shaft 121, but also resist the supporting plate against the bottom of the apparatus.

The foot 110 may generally include a screw rod 410 and a driven rotary disc 420, and may further include a support base 200 and a roller wheel 300, and the screw rod 410 and the driven rotary disc 420 form an adjustment portion 400 of the foot 110. The adjustment portion 400 may be connected to the support base 200.

The screw rod 410 is rotatably screwed into a threaded hole at the bottom of the apparatus where the foot adjusting system 10 is installed, an outer periphery of the driven rotary disc 420 is sleeved with the drive belt 150 so as to be in a transmission connection with the driving rotating shaft 121, and the driven rotary disc 420 is fixedly connected to the screw rod 410 or integrated with the screw rod 410 to form a one-piece part so as to drive the screw rod 410 to rotate.

Generally, when an installation space of the apparatus is relatively small, installation personnel cannot reach some parts of the apparatus, which will limit the installation personnel to adjust the apparatus at these parts, resulting in a great difficulty in a leveling process.

The screw rod 410 has external threads and can be screwed into the threaded hole at the bottom of the apparatus. When the screw rod 410 rotates, the screwing depth of the screw rod 410 into the threaded hole at the bottom of the apparatus can be adjusted. With the foot adjusting system 10 of the embodiment, the driving rotating wheel 120 can be disposed at a position that is easy for the installation personnel to operate. By driving the driving rotating shaft 121 to rotate, the driven rotary disc 420 can be indirectly driven to rotate by a transmission effect of the drive belt 150, thereby driving the screw rod 410 to rotate, which can significantly reduce the leveling and installation difficulty of the apparatus.

For example, when the refrigerator 70 is embedded in a cabinet, the driving rotating wheel 120 can be installed at a front side of the bottom of the refrigerator 70, and the foot 110 can be installed at a rear side of the bottom of the refrigerator 70, and the driven rotary disc 420 can be driven by the drive belt 150 to rotate, thereby indirectly driving the screw rod 410 of the foot 110 to rotate. Due to the limited internal space of the cabinet, after the foot adjusting system 10 of the embodiment is adopted, the leveling difficulty of the refrigerator 70 embedded into the cabinet can be reduced.

The drive belt 150 is sleeved on the outer periphery of the driving rotating shaft 121 and the outer periphery of the driven rotary disc 420 at the same time. The driven rotary disc 420 may be disc-shaped, and second gear teeth 421 meshed with the belt teeth 151 are formed at an outer peripheral edge of the driven rotary disc.

The driving rotating shaft 121 and the driven rotary disc 420 may have the same set thickness to facilitate matching with the drive belt 150. The set thickness can be designed according to actual application conditions, for example, it can be adapted to the belt width of the drive belt 150. For example, the set thickness can be 0.5-10 cm, or it can be any value greater than 10 cm. In other alternative embodiments, the shape of the driven rotary disc 420 can be changed, for example, it may be a square column shape, a hexagonal column shape, or any other shape.

The rotation axes of the driven rotary disc 420 and the screw rod 410 are coaxial with the central axis of the driven rotary disc 420 and the central axis of the screw rod 410. The driven rotary disc 420 extends radially outwards from a bottom section of the screw rod 410. In the embodiment, the rotation axis directions of the driven rotary disc 420 and the screw rod 410 may be in a vertical direction. The screw rod 410 can be formed by extending upward from a middle part of the driven rotary disc 420. For example, the screw rod 410 can be formed by extending upward from the middle part of the driven rotary disc 420. A head of the screw rod 410 can be buried in the driven rotary disc 420, which can simplify the molding process of the adjustment portion 400. The head of the screw rod 410 is integrated with the screw rod 410 to form a one-piece part. The head of the screw rod 410 may be formed by extending radially outward from the bottom section of the screw rod 410.

A part of the support base 200 forms the support platform 210. The driven rotary disc 420 is disposed at the support platform 210. The roller wheel 300 is rollably disposed below the support platform 210.

When the foot adjusting system 10 is in use, the screw rod 410 is in a screwed connection with the threaded hole at the bottom of the apparatus, and the roller wheel 300 is supported on the supporting surface, for example, the ground, of an installation space where the apparatus is located. During the installation of the apparatus, the roller wheel 300 can roll along the supporting surface where the apparatus is located, and the screw rod 410 can rotate relative to the threaded hole at the bottom of the apparatus, so that the foot adjusting system 10 of the embodiment is both suitable for a leveling process of the apparatus and suitable for a moving process of the apparatus. By adopting the foot adjusting system 110 of the embodiment, the installation difficulty of the apparatus can be reduced, the installation efficiency can be increased, and the labor cost is thus lowered.

For example, during the installation of the apparatus, a moving step can be performed first, and then a leveling step is performed. In the moving process, the roller wheel 300 rolls along the supporting surface, which can reduce a frictional resistance during the movement and further reduce the difficulty of the movement. In the leveling step, by driving the screw rod 410 to rotate, the screwing depth of the screw rod 410 into the threaded hole at the bottom of the apparatus can be adjusted so as to adjust the height and/or parallelism of the bottom of the apparatus, so that the operation is easy.

The support base 200 can be cylindrical, square columnar (with top and bottom walls being both rectangular), or can be any other columnar shape.

Figure 4:
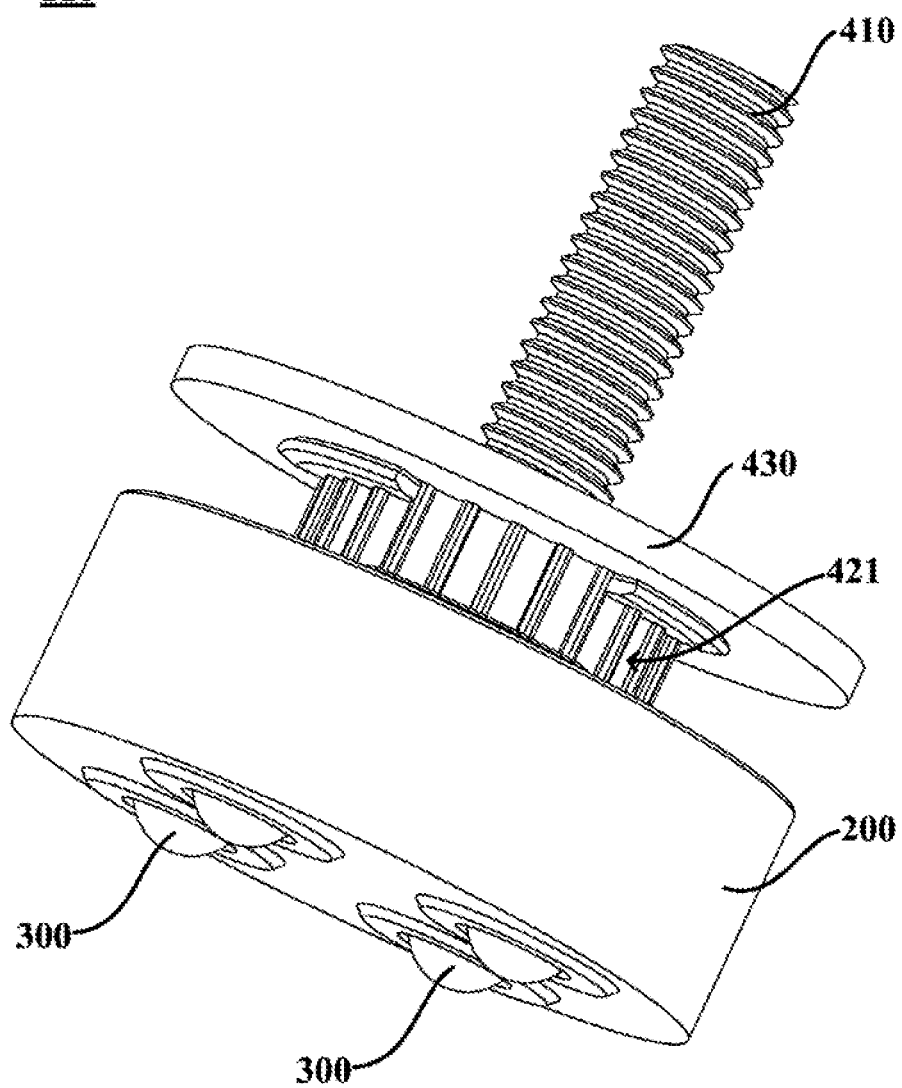
FIG. 4 is a schematic diagram of a foot in the foot adjusting system shown in FIG. 1.

FIG. 4 is a schematic diagram of a foot 110 in the foot adjusting system 10 shown in FIG. 1.

In the embodiment, the support base 200 may be cylindrical. There are a plurality of roller wheels 300 that are spherical, and the support base 200 has a horizontal bottom wall portion, a horizontal top wall portion, and a column body connected between the horizontal bottom wall portion and the horizontal top wall portion. Both the horizontal bottom wall portion (i.e., a bottom surface of a column) and the horizontal top wall portion (i.e., a top surface of the column) of the support base 200 are circular, and on horizontal planes.

A part of the horizontal bottom wall portion of the support base 200 sinks inward to form a plurality of ball socket portions, and the "inward" is relative to an actual use state of the support base 200, and may be roughly upward. The ball socket portions define moving spaces of the roller wheels 300. Each roller wheel 300 is rollably embedded in one of the ball socket portions.

The number of the ball socket portions is not less than 3, for example, it can be 3 or 4. The plurality of ball socket portions are evenly distributed in a spaced manner on the same circumference with a center of the horizontal bottom wall portion as the center of a circle.

The support platform 210 is the horizontal top wall portion of the support base 200. The driven rotary disc 420 may be integrated with the support platform 210 to form a one-piece part, and is formed by extending upward from the support platform 210. That is, the driven rotary disc 420 is located above the support platform 210. The central axis of the driven rotary disc 420 may be coaxial with that of the support base 200.

The driven rotary disc 420 is directly disposed on the support platform 210, and the driven rotary disc 420 and the support platform 210 are integrated to form a one-piece part, which can improve the structural integrity of the foot 110 and enhance the structural stability.

The ball socket portions are configured such that at least one part of the roller wheels 300 protrudes from bottom ends of the ball socket portions when being embedded therein. The roller wheels 300 can be universal balls, for example, steel balls, which can rotate along the levelness, so that the apparatus provided with the foot adjusting system 10 can slide flexibly, and the rotation difficulty of the screw rod 410 of the foot adjusting system 10 is reduced; and therefore, the labor intensity of the installation process can be significantly reduced, and the leveling process of the apparatus is easy to operate, time-saving and labor-saving.

The roller wheels 300 protrude from the bottom ends of the ball socket portions of the support base 200 and directly press against the supporting surface. The screw rod 410 can rotate synchronously together with the support base 200. When the screw rod 410 is driven to rotate, the roller wheels 300 can rotate horizontally, which can not only reduce the rotating difficulty of the screw rod 410 of the installation foot 110, thus greatly reducing the labor intensity of the installation process, but also reduce or avoid the wear of the support base 200 due to contact with the supporting surface, prolonging the service life of the foot adjusting system 10.

In the embodiment, the foot 110 may also include a limiting plate 430, which is fixedly disposed above the driven rotary disc 420 to define, together with the support platform 210, an installation space of the synchronous belt, thus improving the reliability of the matching connection between the synchronous belt and the driven rotary disc 420.

Figure 5:
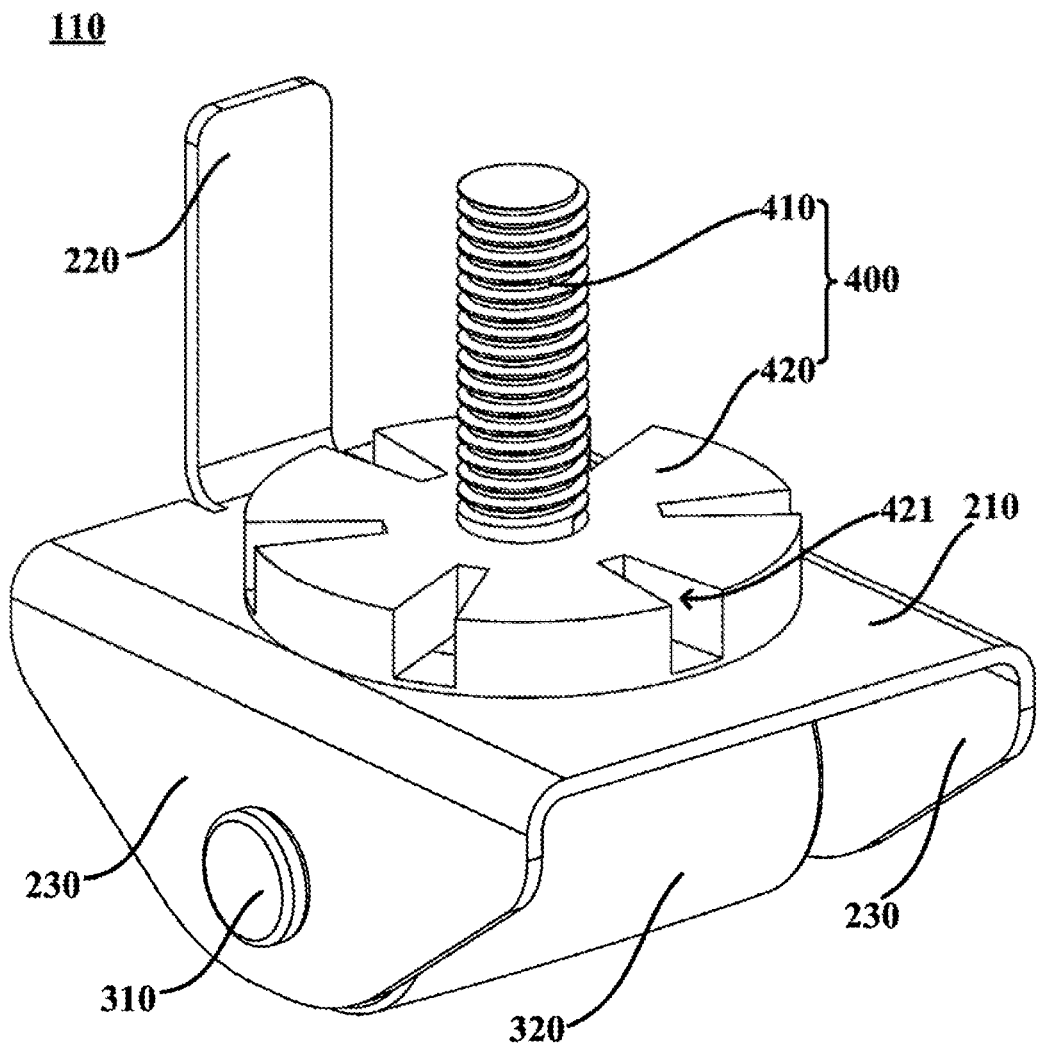
FIG. 5 is a schematic diagram of a foot in a foot adjusting system according to another embodiment of the present invention.

FIG. 5 is a schematic diagram of a foot 110 in a foot adjusting system 10 according to another embodiment of the present invention.

In other alternative embodiments, the structure of the support base 200 and the structure of the roller wheel 300 may be changed, and the foot 110 may further include a connecting piece. The support base 200 may include the support platform 210 and a downturned shaft connecting portion 230, and may further include an upturned stop portion 220. The roller wheel 300 is rollably disposed below the support platform 210. The roller wheel 300 includes a wheel shaft 310 extending in a horizontal direction and a wheel body 320 rotating around the wheel shaft 310.

The support platform 210 may be a horizontal plate wall portion on the support base 200, and the "horizontal" is relative to the actual use state of the installation foot 110. In some alternative embodiments, the plate wall of the support platform 210 may also be a curved surface.

The shape of the support platform 210 may be substantially rectangular, circular, triangular or other arbitrary polygons. In the embodiment, the support platform 210 is substantially rectangular. The support platform 210 is provided with an unthreaded hole 211 running through a thickness direction of a main body plate surface of the support platform 210.

The downturned shaft connecting portion 230 extends downward from the support platform 210, and has a shaft hole 231 for matching with the wheel shaft 310 of the roller wheel 300 so as to enable the wheel shaft 310 of the roller wheel 300 to be rotatably connected to the support base 200. In the embodiment, the downturned shaft connecting portion 230 may be a vertical side wall portion on the support base 200. There may be two downturned shaft connecting portions 230, which are respectively formed by extending downward from opposite edge parts of the support platform 210. Each downturned shaft connecting portion 230 has the shaft hole 231. The shaft holes 231 of the two downturned shaft connecting portions 230 are disposed opposite to each other. Each shaft hole 231 matches one end of the wheel shaft 310 of the roller wheel 300.

In other alternative embodiments, the position and number of the downturned shaft connecting portion 230 may be changed. There may be one downturned shaft connecting portion 230, which is formed by extending downward from the middle part of the support platform 210. The shaft hole 231 of the downturned shaft connecting portion 230 may match a middle section of the wheel shaft 310 of the roller wheel 300.

The upturned stop portion 220 extends upward from the support platform 210 for insertion into a corresponding clamp slot of the apparatus installed on the foot adjusting system 10 to limit the rotation of the support platform 210 relative to the apparatus. Preferably, the upturned stop portion 220 extends upward from a part of the support platform 210 with a distance from the driven rotary disc 420, which can prevent the upturned stop portion 220 from obstructing the rotation of the driven rotary disc 420.

The driven rotary disc 420 is positioned above the unthreaded hole 211. One end of the connecting piece is fixedly connected to the driven rotary disc 420 or integrated with the driven rotary disc 420 to form a one-piece part, and the other end thereof passes through the unthreaded hole 211 and is matched with a lower peripheral edge of the unthreaded hole 211 to limit the freedom of the driven rotary disc 420 to move in a straight line relative to the support platform 210 in its rotation axis direction. That is, during the installation of the apparatus, when the driven rotary disc 420 rotates about its rotation axis, the connecting piece will prevent the driven rotary disc 420 from moving in the vertical direction relative to the support platform 210, so that the driven rotary disc 420 will not be displaced relative to the support platform 210 in the vertical direction.

The connecting piece is not fixedly connected with the lower peripheral edge of the unthreaded hole 211, which allows to only rotate the driven rotary disc 420 and the screw rod 410 without driving the support platform 210 to rotate together, so that the rotation resistance can be reduced and the installation efficiency can be improved.

Figure 6:
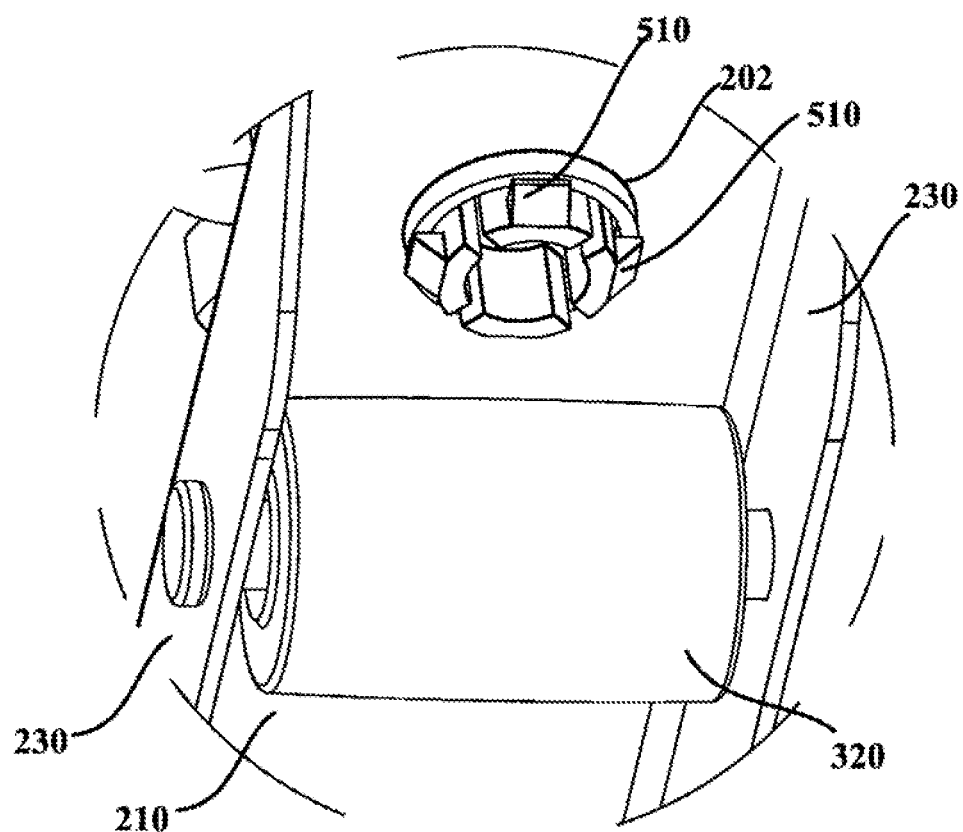
FIG. 6 is a schematic diagram of a partial structure of the foot in the foot adjusting system shown in FIG. 5.

FIG. 6 is a schematic diagram of a partial structure of the foot 110 in the foot adjusting system 10 shown in FIG. 5.

The connecting piece may be a claw. For example, the connecting piece is a hollow cylindrical claw with a plurality of convex buckles 510 in the circumferential direction of a lower edge thereof. The connecting piece can extend downward from the bottom wall of the driven rotary disc 420 and pass through the unthreaded hole 211 to match the lower peripheral edge of the unthreaded hole 211.

Each of the convex buckles 510 has an interstice opening between peripheral wall sections of the claw where it is located, that is, the convex buckles 510 are disposed in turn with interstices therebetween along a circumferential direction along the lower edge of the claw. When the lower edge of the claw is inserted into the unthreaded hole 211, the outer periphery of the lower edge of the claw receives a radially inward force and shrinks inwardly, so that the claw can smoothly pass through the unthreaded hole 211.

A lower surface of each of the convex buckles 510 is an inclined surface that is inclined upward in a radial outward direction, which facilitates the smooth passing of the lower edge of the claw through the unthreaded hole 211, and the "outward" is relative to an actual use state of the hollow cylindrical claw.

The central axis of the hollow cylindrical claw extends in a vertical direction. An upper surface of each of the convex buckles 510 is a plane perpendicular to a peripheral wall of the claw, and may be substantially a horizontal plane. The upper surface of each convex buckle 510 can be in a snap fit with the hole wall of the unthreaded hole 211. The hole wall of the unthreaded hole 211 is provided with a lower annular flange 202 on a lower surface of the support platform 210 so as to form the snap fit with the upper surfaces of the convex buckles 510, which is beneficial to avoiding contact between the upper surfaces of the convex buckles 510 and the main body plate surface of the support platform 210.

In addition, the driven rotary disc 420 can be pressed against the upper surface of the support platform 210 by means of an annular washer or an annular protrusion formed on the lower surface of the driven rotary disc 420, which can reduce the contact area between the driven rotary disc 420 and the upper surface of the support platform 210, and is beneficial to reducing the frictional resistance generated during rotation of the driven rotary disc 420. The annular washer may be disposed between the lower surface of the driven rotary disc 420 and the upper surface of the support platform 210. The annular protrusion may be formed on the lower surface of the driven rotary disc 420.

Figure 7:
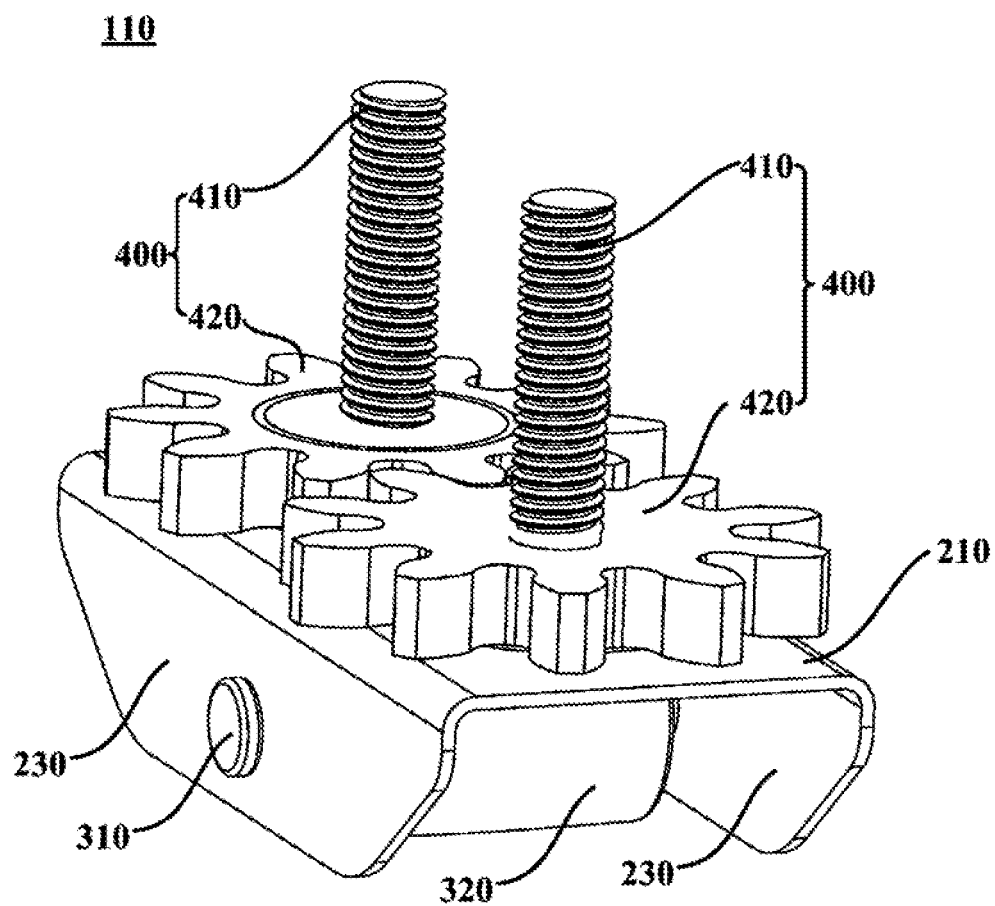
FIG. 7 is a schematic diagram of a foot in a foot adjusting system according to another embodiment of the present invention.

FIG. 7 is a schematic diagram of a foot 110 in a foot adjusting system 10 according to another embodiment of the present invention.

In still other alternative embodiments, there may be two adjustment portions 400, namely, a first adjustment portion 400 and a second adjustment portion 400. A plurality of second gear teeth are formed on an outer peripheral edge of the driven rotary disc 420 of the first adjustment portion 400; a plurality of third gear teeth are formed on the outer peripheral edge of the driven rotary disc 420 of the second adjustment portion 400; and the second gear teeth are in transmission meshing with the drive belt 150, and the third gear teeth are in transmission meshing with the second gear teeth. The screw direction of the screw rod 410 of the first adjustment portion 400 is opposite to that of the screw rod 410 of the second adjustment portion 400. For example, the threads of the screw rod 410 of the first adjustment portion 400 may be right-hand threads, and the threads of the screw rod 410 of the second adjustment portion 400 may be left-hand threads.

The second gear teeth are in transmission meshing with the drive belt 150, which enables the driven rotary disc 420 of the first adjustment portion 400 to rotate along with the driving rotating shaft 121. The third gear teeth are in transmission meshing with the second gear teeth, so that the driven rotary disc 420 of the second adjustment portion 400 can be driven to rotate along with the driven rotary disc 420 of the first adjustment portion 400. The disc diameter of the driven rotary disc 420 of the first adjustment portion 400 is greater than that of the driven rotary disc 420 of the second adjustment portion 400, and the disc diameter refers to the diameter of a circle where the outer peripheral edge of a disc is located. The disc diameter of the driven rotary disc 420 of the first adjustment portion 400 is greater than that of the driven rotary disc 420 of the second adjustment portion 400, which facilitates the arrangement of the drive belt 150 on the driven rotary disc 420 of the first adjustment portion 400, that is, the drive belt 150 can be sleeved on the driven rotary disc 420 of the first adjustment portion 400, so that the driven rotary disc 420 of the first adjustment portion 400 is directly driven to rotate. The driven rotary disc 420 of the second adjustment portion 400 may be passively disposed at one side of the driven rotary disc 420 of the first adjustment portion 400 and located at an inner side of the drive belt 150, thus being driven by the driven rotary disc 420 of the first adjustment portion 400 to rotate accordingly.

The foot adjusting system 10 of the embodiment can simultaneously adjust the screwing depths of the screw rod 410 of the first adjustment portion 400 and the screw rod 410 of the second adjustment portion 400 into the corresponding threaded holes during the installation of the apparatus, thus ensuring the adjustment stability of the apparatus, and simplifying the adjustment process of the foot adjusting system 10.

The driven rotary disc 420 of the second adjustment portion 400 rotates along with the driven rotary disc 420 of the first adjustment portion 400 passively, and the screw directions of the screws 410 of the two adjustment portions 400 are set to be opposite, which can ensure that the screw rods 410 of the two adjustment portions 400 are screwed into or out of the corresponding threaded holes synchronously, so that the consistency of the first adjustment portion 400 and the second adjustment portion 400 is guaranteed during the adjustment.

Figure 8:
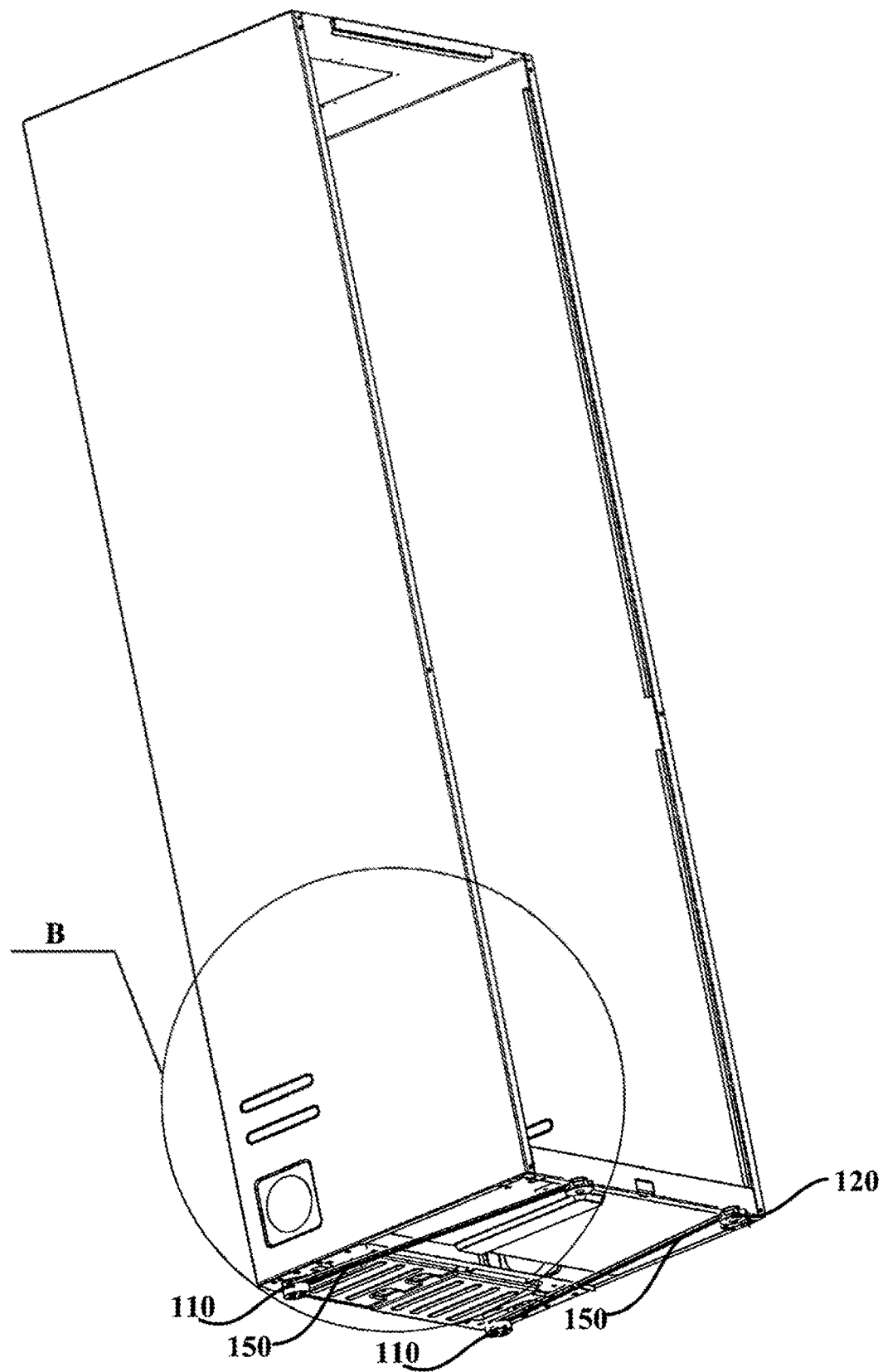
FIG. 8 is a schematic diagram of a refrigerator according to an embodiment of the present invention.
Figure 9:
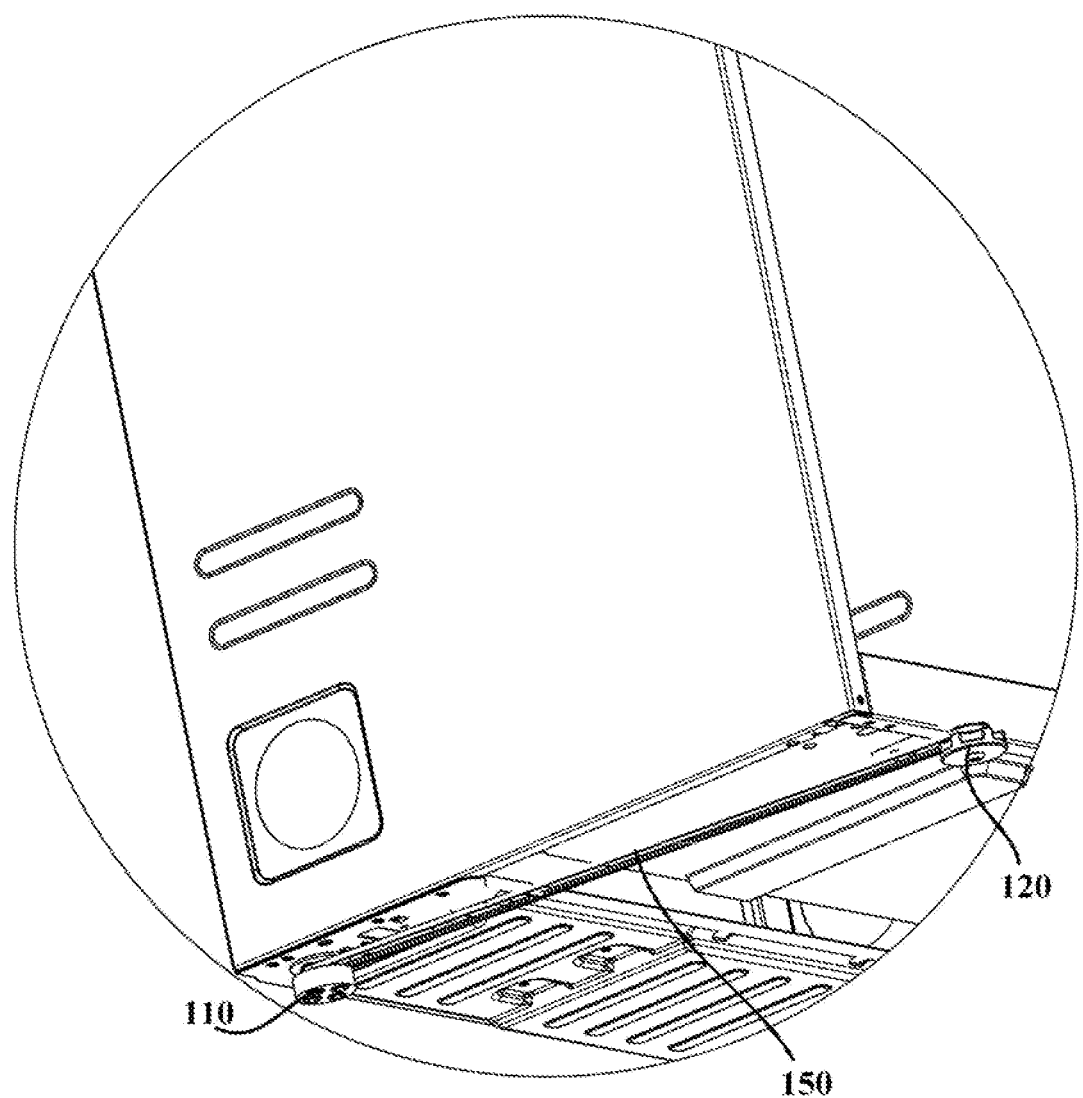
FIG. 9 is a partial enlarged view of B in FIG. 8.

The foot adjusting system 10 of the above embodiments is especially suitable for a built-in refrigerator 70. FIG. 8 is a schematic diagram of a refrigerator 70 according to an embodiment of the present invention, and FIG. 9 is a partial enlarged view of B in FIG. 8.

At least one foot adjusting system 10 according to any one of the above embodiments is disposed at a bottom of the refrigerator 70. The bottom of the refrigerator 70 is provided with a threaded hole, and the screw rod 410 of the foot 110 is in a screwed connection with the threaded hole.

Because the foot adjusting system 10 of the refrigerator 70 of the embodiment has both a leveling function and a moving function, it is possible to reduce or avoid the installation of other auxiliary structures on the bottom of the refrigerator 70, thereby simplifying the installation structure of the refrigerator 70 and reducing the manufacturing cost.

There may be one or more foot adjusting systems 10, for example, there may be two. The relative positions of the driving rotating wheel 120 and the foot 110 can be arranged according to actual needs. For example, the driving rotating wheel 120 of each foot adjusting system 10 can be disposed at a front side of the bottom of the refrigerator 70, and the foot 110 of each foot adjusting system 10 may be disposed at a rear side of the bottom of the refrigerator 70. In the process of installing the refrigerator 70, especially in the leveling process, the flatness of the rear side of the refrigerator 70 can be adjusted at the front side of the refrigerator 70, so that the leveling process is very simple.

In some other alternative embodiments, the front side of the bottom of the refrigerator 70 may be provided with a rollable front wheel.

Figure 10:
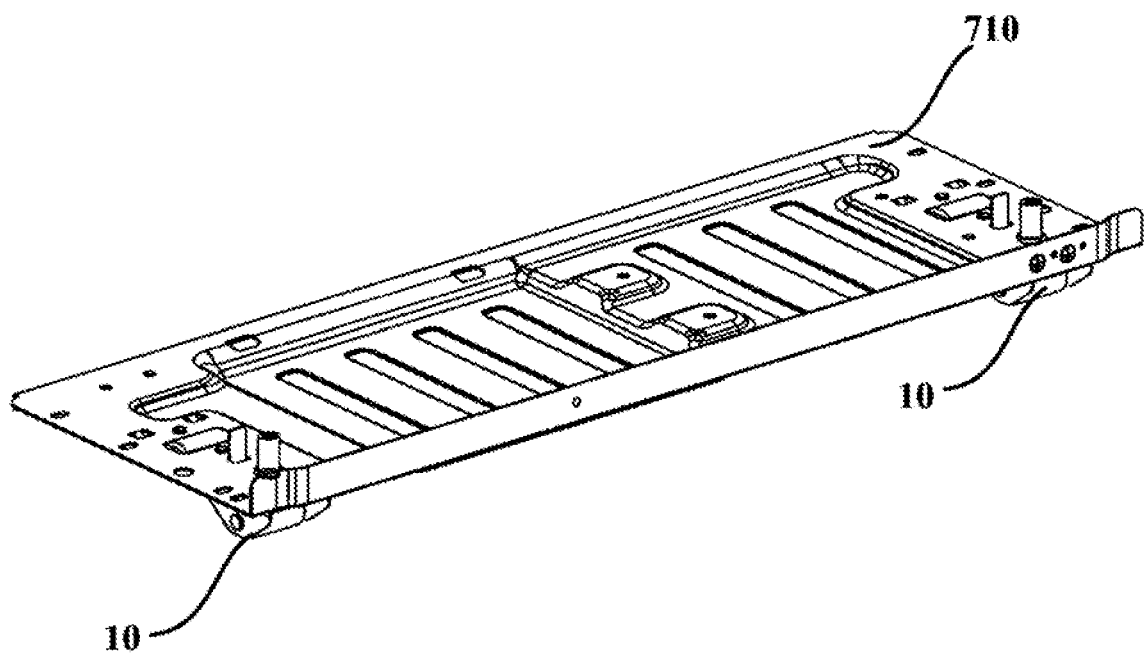
FIG. 10 is a schematic diagram of a bottom plate and a foot adjusting system of a refrigerator according to an embodiment of the present invention.

FIG. 10 is a schematic diagram of a bottom plate 710 and a foot adjusting system 10 of a refrigerator 70 according to an embodiment of the present invention.

A threaded hole is formed in the bottom plate 710 of the refrigerator 70. The bottom plate 710 can be directly a bottom plate 710 of a refrigerator body of the refrigerator 70, or can be an additional bottom plate 710 on the refrigerator body. The bottom plate 710 of the refrigerator 70 is provided with a screw cylinder extending upward from a plate surface on which the bottom plate 710 is located, and the threaded hole is formed in the screw cylinder.

According to the foot adjusting system 10 and the refrigerator 70 having same of the embodiment, the foot adjusting system 10 includes a driving rotating wheel 120, a drive belt 150, and a foot 110. A part of the driving rotating wheel 120 forms a driving rotating shaft 121, and the drive belt 150 is sleeved on an outer periphery of the driving rotating shaft 121. The foot 110 is provided with a screw rod 410 and a driven rotary disc 420, the screw rod 410 is rotatably screwed into a threaded hole at a bottom of an apparatus, the driven rotary disc 420 is in a transmission connection with the driving rotating shaft 121 by means of the drive belt 150 and is fixedly connected to the screw rod 410 or integrated with the screw rod 410 to form a one-piece part so as to drive the screw rod 410 to rotate. By adopting the foot adjusting system 10 of the embodiment, the screw rod 410 is indirectly driven to rotate by driving the driving rotating shaft 121 to rotate, such that the leveling difficulty of the apparatus can be obviously reduced, the installation difficulty of the apparatus can also be reduced, and the installation efficiency of the built-in refrigerator 70 can be increased.

So far, those skilled in the art should realize that although a plurality of exemplary embodiments of the present invention have been illustrated and described in detail herein, many other variations or modifications consistent with the principles of the present invention may be directly determined or derived from the contents disclosed by the present invention without departing from the spirit and scope of the present invention. Therefore, the scope of the present invention should be understood and deemed to cover all these other variations or modifications.

What is claimed is:

1. A foot adjusting system, comprising:
    a driving rotating wheel, which comprises a driving rotating shaft and a driving rotary disc, wherein the driving rotary disc is fixedly connected to the driving rotating shaft or integrated with the driving rotating shaft to drive the driving rotating shaft to rotate and is configured to be supported on a supporting surface where an apparatus with the foot adjusting system being installed is located, and the driving rotating wheel is not inserted into the apparatus;
    a drive belt, sleeved on an outer periphery of the driving rotating shaft; and
    a foot, provided with a screw rod and a driven rotary disc, the screw rod being rotatably screwed into a threaded hole at a bottom of an apparatus where the foot adjusting system is installed, an outer periphery of the driven rotary disc being sleeved with the drive belt so as to be in a transmission connection with the driving rotating shaft, and the driven rotary disc being fixedly connected to the screw rod or integrated with the screw rod to form a one-piece part so as to drive the screw rod to rotate.

2. The foot adjusting system according to claim 1, wherein
    belt teeth are formed at an inner peripheral edge of the drive belt;
    the driving rotating shaft is a gear shaft, and first gear teeth meshed with the belt teeth are formed on an outer peripheral edge of the driving rotating shaft; and
    the driven rotary disc is disc-shaped, and second gear teeth meshed with the belt teeth are formed on an outer peripheral edge of the driven rotary disc.

3. The foot adjusting system according to claim 1, wherein
    the rotation axes of the driven rotary disc and the screw rod are coaxial with the central axis of the driven rotary disc and the central axis of the screw rod; and
    the driven rotary disc extends radially outwards from a bottom section of the screw rod.

4. The foot adjusting system according to claim 1, wherein
    the foot further comprises:
    a support base, a part of which forms a support platform, and the driven rotary disc being disposed on the support platform; and
    a roller wheel, rollably disposed below the support platform.

5. The foot adjusting system according to claim 4, wherein
the support base is cylindrical, and the support platform is a horizontal top wall portion on the support base; and the driven rotary disc is integrated with the support platform to form a one-piece part, and is formed by extending upward from the support platform;
the support base further comprises: a horizontal bottom wall portion, a part of which sinks inward to form a plurality of ball socket portions; and
there are a plurality of roller wheels that are spherical, and each of the roller wheels is embedded in one of the ball socket portions.

6. The foot adjusting system according to claim 4, wherein
the roller wheel comprises a wheel shaft extending in a horizontal direction, and a wheel body rotating around the wheel shaft;
the support platform is a horizontal plate wall portion on the support base; and the driven rotary disc is rotatably disposed at the support platform; and
the support base further comprises: a downturned shaft connecting portion, extending downward from the support platform and having a shaft hole for matching with the wheel shaft so as to enable the wheel shaft to be rotatably connected to the support base.

7. The foot adjusting system according to claim 6, wherein
the support platform is provided with an unthreaded hole running through a thickness direction of a main body plate surface of the support platform;
the driven rotary disc is disposed above the unthreaded hole; and
the foot further comprises a connecting piece, one end of which is fixedly connected to the driven rotary disc or integrated with the driven rotary disc to form a one-piece part, and the other end of which passes through the unthreaded hole and is matched with a lower peripheral edge of the unthreaded hole to limit the freedom of the driven rotary disc to move in a straight line relative to the support platform in the rotation axis direction thereof.

8. The foot adjusting system according to claim 1, wherein
the driving rotary disc is disc-shaped, and at least one groove or protrusion is formed on an outer periphery of the driving rotary disc to match a wrench tool and/or another drive belt; and
the rotation axes of the driving rotary disc and the driving rotating shaft are coaxial with the central axis of the driving rotary disc and the central axis of the driving rotating shaft; and the driving rotary disc extends radially outwards from a bottom section of the driving rotating shaft.

9. The foot adjusting system according to claim 1, wherein
the screw rod and the driven rotary disc form an adjustment portion of the foot;
the foot includes two said adjustment portions that are a first adjustment portion and a second adjustment portion, respectively;
a plurality of second gear teeth are formed on an outer peripheral edge of the driven rotary disc of the first adjustment portion; a plurality of third gear teeth are formed on the outer peripheral edge of the driven rotary disc of the second adjustment portion; and the second gear teeth are in transmission meshing with the drive belt, and the third gear teeth are in transmission meshing with the second gear teeth; and
the disc parameter of the driven rotary disc of the first adjustment portion is greater than that of the driven rotary disc of the second adjustment portion, and screw direction of the screw rod of the first adjustment portion is opposite to that of the screw rod of the second adjustment portion.

10. A refrigerator, comprising:
at least one foot adjusting system according to claim 1, disposed at a bottom of the refrigerator, the refrigerator comprising said apparatus, the bottom of the refrigerator being provided with the threaded hole, and the screw rod being in a screwed connection with the threaded hole.

* * * * *